June 5, 1956 L. M. GOODRIDGE 2,748,561
VACUUM MOTOR ELECTRIC BOOSTER

Filed Aug. 23, 1951 2 Sheets-Sheet 1

*INVENTOR.*
LAURENCE M. GOODRIDGE
BY George R. Ericson
ATTORNEY

June 5, 1956  L. M. GOODRIDGE  2,748,561
VACUUM MOTOR ELECTRIC BOOSTER

Filed Aug. 23, 1951  2 Sheets-Sheet 2

INVENTOR.
LAURENCE M. GOODRIDGE
BY
ATTORNEY

United States Patent Office 2,748,561
Patented June 5, 1956

2,748,561

VACUUM MOTOR ELECTRIC BOOSTER

Laurence M. Goodridge, Brentwood, Mo., assignor to Carter Carburetor Corporation, St. Louis, Mo., a corporation of Delaware Application August 23, 1951, Serial No. 243,298

11 Claims. (Cl. 60—6)

This invention relates to a power motor system for operating the accessories on motor vehicles and the like. More specifically, the invention pertains to a combined type of motor and its control system for separate sources of power for that motor whereby more dependable operation is obtained. For purposes of illustration, in this application the motor system has been shown applied to operate the windshield wiper blades. Generally speaking, motors for this purpose are of the fluid type and derive their source of power from the intake manifold of the engine of the vehicle. This source is a convenient one and readily accessible for the purpose. For this reason, the suction or vacuum operated type of motor has become widely used in automobile art.

The amount of suction in the intake manifold available for this purpose is variable through a wide range, depending entirely upon the demand for power from the engine as indicated by throttle opening. Any fluid motor operated with the intake manifold as a source of power will therefore be variable in the amount of power derived therefrom, and in its operating speed. This would not be too objectionable, perhaps, if motor operation were maintained continuous at all times, but this is not always the case. During conditions demanding full throttle opening to derive the desired power from the engine, the intake manifold suction decreases to practically zero, and the motor driving the windshield wipers slows down and finally comes to rest. This can be decidedly dangerous for safe operation of the vehicle, since the wipers fail to perform their usual function, and visibility becomes increasingly bad during the interval that the wipers have stopped. For this reason it has become a practice to substitute either fully electric driven windshield wipers or to provide a booster pump combined with the vacuum gasoline pump to work in conjunction with and supplement the vacuum or suction in the intake manifold. An all electric drive requires an expensive type of electric motor which will stand the continuous operation over a long period of years. On the other hand, the booster system, although quite satisfactory, is obviously more expensive due to the fact that it requires a separate construction built into the fuel pump.

*Brief description of the invention*

The present invention resides in a system which combines two or more devices in a new and novel manner to solve the problems which confront either total vacuum motor operation or wholly electric type of operation of automobile accessory devices. For example, the present system combines electric motor operation with the usual vacuum motor operation of the accessory devices. According to this invention, one of the elements of the system is a combined type of motor with a fluid powered part and an electric powered part. The fluid motor part is connected in the usual manner to a power source, in this case the intake manifold of the engine, and this connection is controlled by the usual valve mechanism provided with a manual control which provides for operation of the motor and also for a parked position which is displaced to one extreme position of the stroke of the fluid motor. In addition, the system also employs an electrically operated solenoid motor part directly connected to the fluid operated motor, which motor is of a type directly producing an oscillating motion similar to that of the particular fluid motor part and directly connected to the operating shaft of the fluid motor part. A solenoid motor has been used for this purpose because it requires no gearing, and also because, generally speaking, it is the cheapest possible type to build in production. Although this type has been considered unsatisfactory in the past because it lacked speed regulation, in the combination proposed, the two motors are mechanically interconnected as one motor, so that the fluid motor regulates the speed of the solenoid motor.

To operate the electric solenoid motor, there is provided a connection to the power source or battery of the motor vehicle through the ignition switch, a pressure operated switch, and a switch on the control knob for the fluid motor, in series, so that, with ignition switch on and the control knob in a position demanding power from the fluid motor, a decrease in the source of suction pressure in the intake manifold will actuate the pressure switch to operate the electric motor and boost the action of the fluid motor temporarily until the suction pressure again increases in the manifold sufficient to operate the motor satisfactorily.

In the drawings Fig. 1 is a diagrammatic view of the system of the invention. Fig. 2 is a view partly in section showing that system adapted to operate the windshield wipers of a motor vehicle. Fig. 3 is an elevational view of one side of the motor of this invention. Fig. 4 is a side view of the opposite side of the motor of this invention, and Fig. 5 is a view in section showing the pressure operated switch used in the system.

*Detailed description of the invention*

Figure 1:
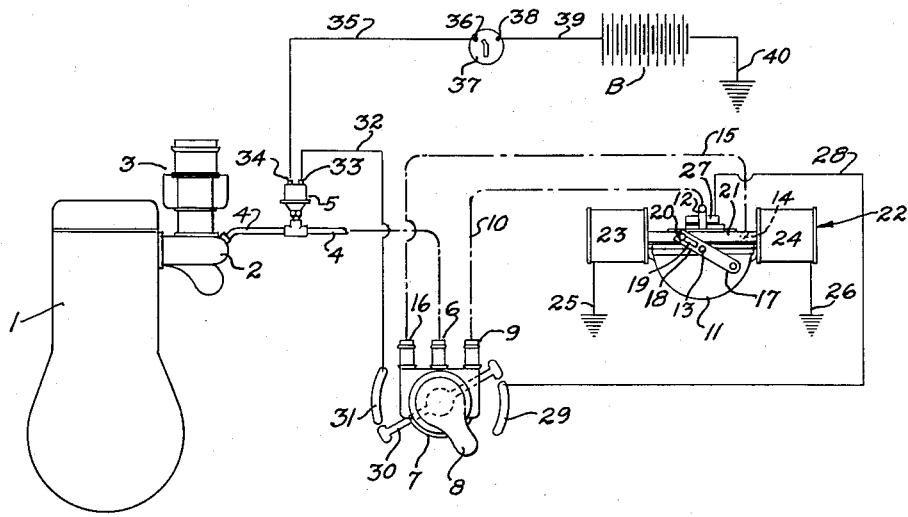

Referring to Fig. 1, an engine indicated as 1 is diagrammatically shown provided with an intake manifold 2 and a carburetor on the intake manifold at 3. Connected to the intake manifold 2 is a line 4 which extends to a pressure operated switch 5. From the pressure operated switch 5, the line 4 extends to one connection 6 with the control valve 7 for the fluid motor. The control valve 7 is provided with a manually operated knob 8, which, as illustrated in the Fig. 1, is in the off position. The effect of this off position on the operation of the system will be described later. From a connection 9 of the valve 7 a primary line 10 extends to the primary suction connection 12 with the fluid motor 11. The motor 11 to which the line 10 connects is of the conventional oscillating type, and is provided with a vane piston which oscillates the main shaft 13 of the motor on each stroke of the vane to and fro within the casing of the motor 11. A second connection to the valve 7 is provided on the fluid motor 11 and indicated at 14. From this connection a line 15 runs back to the opposite side of the valve 7 to a connection 16 thereon.

The system so far described is wholly conventional in the motor vehicle art, and operates in an obvious manner, as do all such systems. In the position of the knob 8 on the valve 7 indicated in Fig. 1 the communication between line 4 and line 15 is established. In this position the motor 11 is held at one extreme position of its operating stroke, as indicated in this figure. This is generally referred to as the parked position. Rotation of the manual control 8 to the right in a clockwise direction disconnects the communication between line 15 and line 4, and establishes connection between the line 4 and the line 10, thus connecting the line 4 directly to the primary suction connection of the fluid motor 11 to operate the same in response to the degrees of opening of the valve 7 as controlled by the knob 8. This produces an oscillating motion on the shaft 11, which is communicated to the rocker 17.

In the motor shown, the rocker 17 is provided with an oppositely extending part 18, which is slotted at 19 to receive the pin 20. Pin 20, in turn, is fixedly mounted in position on the armature 21 of the solenoid motor part generally indicated as 22. Motor 22 is provided with two opposite field coils 23 and 24 electrically connected to ground respectively at 25 and 26. Each coil is also connected to a commutator type of switch generally indicated as 27, which switch is operated intermittently to successively connect the coils 23 and 24 in the electric circuit in response to actuation of the valve mechanism of the fluid motor 11, as will be later described in detail. Switch 27 is electrically connected by lead 28 to one terminal 29 of a switch generally indicated as 30. Switch 30 is of the double pole variety having another opposite terminal 31, connected by the lead 32 to one terminal 33 of a pressure operated switch 5.

Opposite terminal 34 of suction switch 5 is in turn connected by a lead 35 to one terminal 36 of ignition switch 37. The opposite terminal of the ignition switch 37 indicated at 38 is connected to the battery B by lead 39, and through the battery to ground 40 to complete this circuit from battery through the switches just described to the field coils of the solenoid motor, and again to ground.

Switch 30 is constructed to turn with valve 7 when operated by control knob 8, and it will be noted that in its off position, illustrated in Fig. 1, the switch 30 does not contact the opposite terminals 29 and 31. For this reason, when the manual control knob 8 is in a position connecting the line 15 with the primary line 4, the motor is in a parked position, and the circuit from the battery to ground is open, regardless of the position of the ignition switch or the pressure operated switch 5. On the other hand, once the control knob is rotated clockwise to connect primary line 4 with primary line 10 to operate the fluid motor 11, switch 30 contacts terminals 29 and 31 to complete the circuit between lead 28, connected with the solenoid motor, and lead 32, connected with the pressure switch 5. Terminals 29 and 31 are elongated arcuately to that this condition will exist even when valve 7 is wide open, which occurs when control knob 8 is rotated to its full extent in a clockwise direction.

Taking a condition, now, when the engine 1 is operating, ignition switch 37 is on, and control knob 8 is rotated to any position opening volve 7 and closing the switch 30 and connecting the lines 4 and 10 to operate the fluid motor 11, it can readily be seen that, under such circumstances, a decreased manifold depression which closes switch 5, completes the electric circuit from the battery to the solenoid motor. Instead of motor 11 slowing down as a result of this manifold pressure condition, its action will be automatically boosted by the aid of the solenoid motor, which is now energized by the closing of switch 5, and this condition will continue until manifold pressure again cuts out operation of solenoid motor 22 by opening switch 5.

Figure 2:
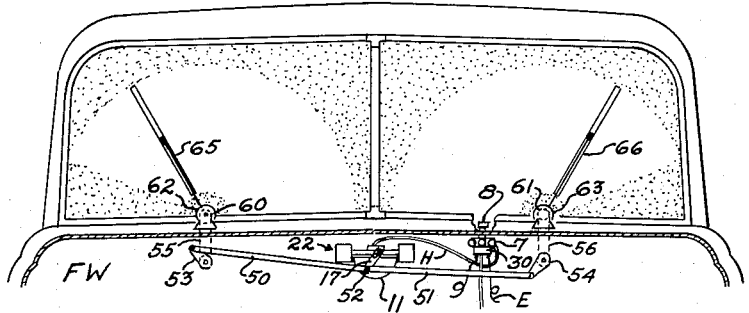

So far, a system has been described for boosting the operation of a fluid motor for any general purpose. For a specific application of the fluid motor system, reference is now made to Fig. 2 of the drawings. Therein is shown diagrammatically a system such as previously described applied to operate the dual windshield wipers of an automobile. Only so much of the automobile structure is shown as is necessary to illustrate one example of the application of the system. Fluid motor 11 is shown centrally located with respect to the fire wall FW of the engine compartment. The solenoid motor mounted thereon is indicated as 22. The electric and hydraulic lines leading from the motor are generally indicated as H and E, and it will be understood that the system used here is identical with that above described, but, since it is not deemed necessary to show in detail the actual hydraulic and electric lines, they are given a general letter designation and illustrated diagrammatically. The combined switch and valve is shown as 7 and 30, and control knob 8 is disposed on the dash or instrument panel of the automobile, and suitable connections from the combined valve and switch are provided by hydraulic lines H to the manifold and electric lines E to the ignition switch as above explained. A portion of the outside windshield mounting is broken away to illustrate the position of the switch and control knob. In this view rocker arm 17 is connected to a pair of drag links 50 and 51 by a pin connection 52. The opposite ends of the drag links 50 and 51 are connected, respectively, with crank sprocket arms 53 and 54. The sprockets on the cranks are connected by chains 55 and 56 with sprockets 60 and 61 inside casing 62 and 63, and these, in turn, drive the windshield wiper arms and blades generally indicated at 65 and 66, which are mounted to clear each of the windshields, as illustrated in the drawing.

Some of this is more or less conventional structure, and a further detail description does not appear necessary to a complete understanding of the invention. It is believed apparent that oscillating motion of rocker arm 17 will produce a translation in the links 50 and 51, and, because of their interconnection with the crank arms, rotation of the sprockets 53 and 54 in opposite directions, this motion in turn will be transmitted to the wiper blades 65 and 66 through the chain connections, likewise producing opposite oscillations of the wipers.

Figure 3:
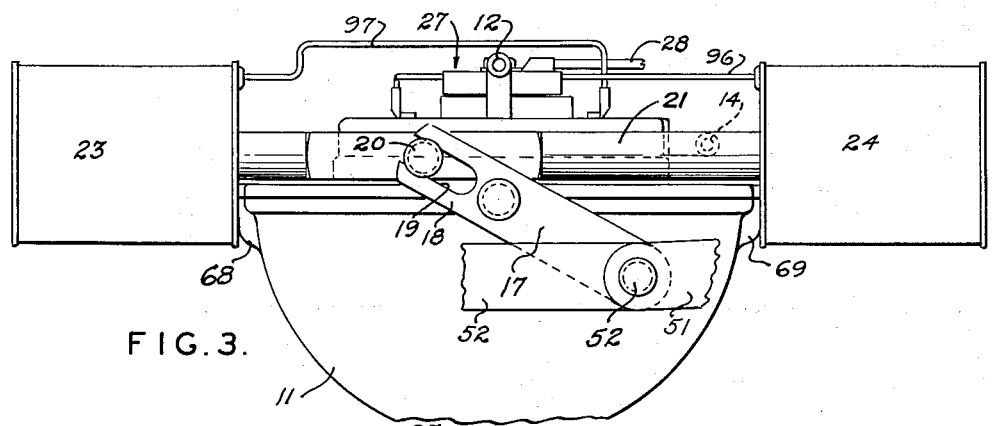
Figure 4:
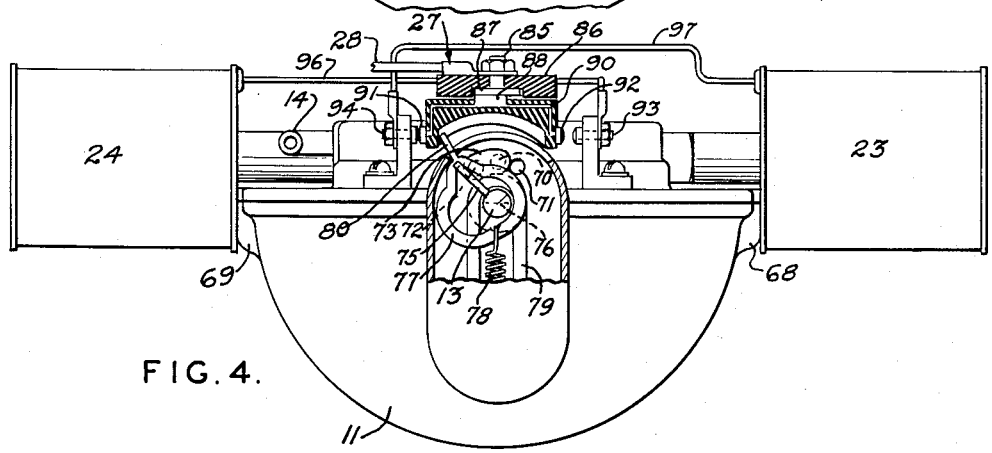

Referring to Figs. 3 and 4, the combined motor of this invention is shown on an enlarged scale, so that its operation and construction can be clearly understood. The primary suction connection of the fluid motor, previously described, is indicated at 12, and this connection communicates directly with the center one of three ports indicated as 70, 71 and 72 in Fig. 4. This figure has a valve cover of the valve chamber partially broken away to illustrate the general manner of constructing this type of oscillating fluid motor. The ports above mentioned are interconnected by an oscillating valve 73, which alternately covers, and provides communication between, the primary port 70 and either port 72 or port 71, as the case may be. The valve 73 is provided with a passage on its active side for this particular purpose. To operate the valve 73 is shown a conventional mechanism mounted on or about the shaft 13 of the fluid motor. For example, the shaft 13 may carry a blade member 75 in such a manner that the blade is free to rock on the shaft 13 through a limited range. This is shown by the dotted line 76, which indicates the segmental shape of the mounting for the blade 75 within the shaft 13. The blade in turn carries a kicker 77, and its outer edge is received in the kicker and acts as a fulcrum about which the kicker may rock. To hold the kicker snugly against the upper edge of the blade 75 is a spring 78 attached to the kicker centrally of its bottom extent and fastened to a stationary part of the valve tensioning device 79. Either the kicker or the valve may be provided with inter-engaging spaced lugs whereby movement of one is imparted to the other. The valve tensioning device is anchored at its lower end, and the spring 78 attached thereto and to the kicker produces the double function of biasing the kicker in the one extreme or the other of its positions, one being shown in Fig. 4, and of maintaining the upper portion of the valve tensioning element 79 which is concentric with the shaft against the outer surface of the valve 73, which is likewise rotatably mounted.

In operation the shaft 13 is oscillated back and forth due to the action of the piston vane within the motor, responding to pressure conditions. Each oscillatory movement of the shaft 13 engages and drives the blade member 75 in the same way but to a lesser extent, due to the lost motion type of interconnection between the blade mounting and the shaft 13. On engagement, the blade is moved from left to right, or vice versa, as the case may be, carrying with it the kicker element 77. Once the kicker element passes a vertical position, the shaft 13 nears the completion of its rotation in one direction or the other, and, since the kicker has been moved beyond the dead center position of the blade 75, spring 78 comes into play, snapping the kicker to an extreme displaced opposite position. During this snapping action, the kicker engages a lug or lugs on the valve 73 and shifts it to a new position uncovering one of the ports, 72 for example, and covering ports 70 and 71. This, in turn, reverses the flow to the fluid motor and, in turn, reverses the actuation of the piston to rotate the shaft 13 to a return position.

The fluid motor is also provided, as has been described, with a connection 14 which provides for a parked position of the fluid motor in one extreme position of its stroke.

This description so far is intended to illustrate one type of fluid motor which is deemed suitable for the particular system described. Such a fluid motor is illustrated and described by the patent to Hueber, No. 1,978,634, of October 30, 1934.

The only difference between the fluid motor described therein and that herein described is a slight addition necessary to operate a commutator switch for the solenoid motor. In other words, to a conventional fluid motor is added a finger 80, or its mechanical equivalent, on the kicker 77. This finger protrudes through the valve casing of the fluid motor, and is adapted to engage and reciprocate the commutator switch, which will now be described. It is contemplated that a means to actuate the switch may be applied to any timed reciprocating or oscillating part in any fluid motor.

In Figs. 3 and 4 the switch is generally indicated by the reference character 27. This switch is of the single pole, double throw type, and is provided with a power connection 28, which attaches to a terminal 85 on the stationary switch body 86. The switch body is of insulating material and provided with a center enlarged contact 87. The brush 88 mounted in the movable portion of the switch body 90 remains constantly in contact with this contact 87, regardless of its direction of displacement. On the movable portion of the switch body 90 are two contacts 91 and 92 connected with the brush 88, and alternately cooperating with these contacts are fixed contacts 93 and 94, to which are attached leads 96 and 97, respectively, connecting directly with the field coils 23 and 24.

From this description it will be readily understood that movement of the finger member 80 operates to shift the movable portion of the switch 90 by contact therewith from one position, in which it connects the terminals 91 and 94, to its opposite position, where it connects terminals 92 and 93. Since the kicker actually moves only adjacent the extreme of the stroke of the fluid motor, it is apparent that the energization of the alternate field coil occurs almost simultaneously with the extreme positions of stroke of the fluid motor. The shifting of the switch body will complete the circuit from the primary connection 28 through the commutator type switch 27 to alternate field coils in timed relation with the oscillation of the fluid motor.

Referring to Fig. 3 specifically, the rocker arm is shown at 17, and also the connection of the armature 21 by means of pin 20 in slot 19. It will be understood that alternate energizing of the field coils produces the reciprocation of armature 21 and of the rocker 17 through this connection. The field coils in turn are mounted on ears 68 and 69 rigid with the fluid motor.

Figure 5:
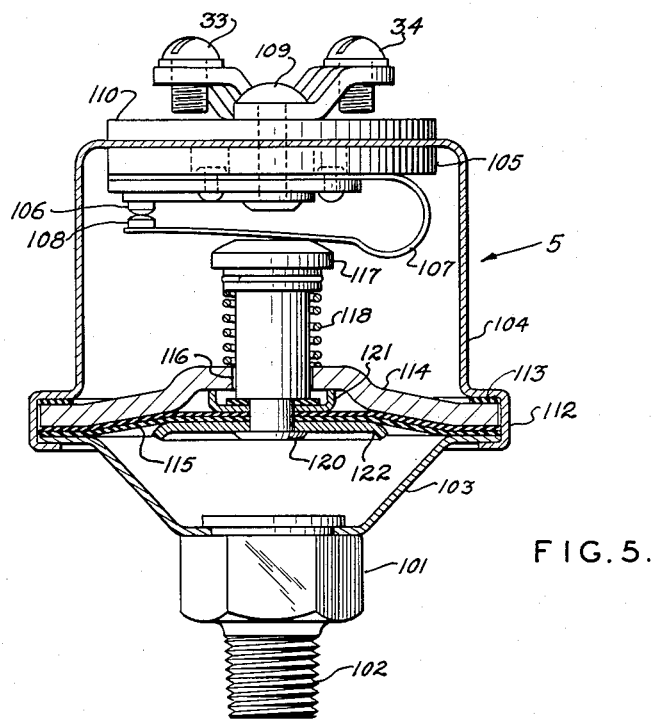

Fig. 5 illustrates one preferred form for a suction switch generally indicated at 5 in Fig. 1. The switch comprises a nipple 101 provided with threads 102 for connection with the manifold line 4 or the like, and a two-part outer casing with a lower part 103 sealed to nipple 101 and an upper part 104 of inverted cup shape carrying inside its upper wall a switch base member 105. On this base is a fixed contact 106 and a U-shaped spring 107 carrying a second contact 108 opposed to contact 106. Both are attached to the casing by rivets 109 passing through the casing, the base plate and a cover plate 110 of insulating material. Contacts 106 and 108 are connected to terminals 33 and 34, respectively, to which are connected leads 32 and 35 of Fig. 1.

The upper part of the casing 104 is provided with a reentrant flange portion 112 which supports in superposed relation an upper sealing gasket 113, the peripheral flange portion of a bridge member 114, a flexible diaphragm 115, and the flange of lower housing member 103 respecively. The bridge member 114 is centrally apertured at 116 to receive a headed plunger 117 of insulating material which has a metal shank portion slidable in the aperture and urged in an upward direction by a spring 118 with its upper end bearing against the underside of the head 117 of the plunger, and its lower end resting against the upper side of the bridge. The plunger 117 is attached to the diaphragm 115 by a headed end portion 120 and a pair of washers 121 and 122 between which the diaphragm 115 is secured.

The spring 118 and the diaphragm 115 are so proportioned that when manifold depression is unstaisfactory for fluid motor operation the spring 118 will raise 117 to close contacts 106 and 108 and the electric circuit between terminals 33 and 34. On the other hand, when manifold depression is sufficient for satisfactory fluid motor operation, it will act on the diaphragm to maintain plunger 117 in a depressed position compressing spring 118 and opening contacts 106, 108 to open the circuit between the terminals.

A structure has been described which will carry out each of the several objectives of the invention above enumerated. A combined motor having fluid motor part and booster device has been described responsive to the degree of intake manifold depression for completing an electric circuit to the booster to aid operation of the fluid motor part at the time when that fluid motor slows or would stop due to lack of depression in the intake manifold. It is also pointed out that, due to the setting or degree of opening of the vlave 7, the speed of operation of not only the fluid motor, but also the electric booster, will be controlled. In the latter case, the valve acts just as much as a throttling device as in the former, and will consequently limit the speed of reciprocation of the solenoid motor, due to the damping effect produced by the fluid motor when, under such circumstances, it is pumping against the restriction of the valve in the fluid line.

The above description should be taken as illustrative of one example only of the form which a structure according to this invention may take, and likewise one application to which it may be adapted, and should not be regarded as restrictive in any sense.

I claim:

1. A motor accessory drive system for power operated devices on motor vehicles and the like, comprising a power source on the motor vehicle including a first means producing a fluid pressure, a fluid motor operated therefrom to drive said devices during motor vehicle operation and a second means to operate said fluid motor independent of said first means, said fluid motor having a fluid pressure operated part, a second powered part, and a single output shaft, means interconnecting said parts to turn said output shaft and operated from said power source for power actuation of said devices, and separate control connections between said first and second means and said motor to supply power to each motor part and automatically responsive to speed changes of said motor shaft to selectively control the flow through said connections.

2. A motor accessory drive system for power operated devices on motor vehicles and the like, comprising a power source on the motor vehicle including a first means producing a fluid pressure, a fluid motor operated therefrom to drive said devices during motor vehicle operation and a second means to operate said fluid motor independent of said first means, said motor having a fluid pressure operated part, a second powered part, and a single output shaft, means interconnecting said parts to turn said output shaft and operated from said power source for power actuation of said devices, and separate control connections between said first and second means and said motor to supply power to each motor part, power flow sensing means in said connections responsive to variations producing speed changes of said motor to selectively control the flow of power from said source.

3. A motor accessory drive system for power operated devices on motor vehicles and the like, comprising a power source on the motor vehicle including a first means producing a fluid pressure, a fluid motor operated therefrom to drive said devices during motor vehicle operation and a second means to operate said fluid motor independent of said first means, said motor having a fluid pressure operated part, a second powered part, and a single output shaft, means interconnecting said parts to turn said output shaft and operated from said power source for power actuation of said devices, and separate controll connections between said first and second means and said motor to supply power to each motor part, sensing means in said control connections responsive to decrease in power to selectively control the flow of power through said connections from said second means to said motor.

4. A motor accessory drive system for power operated window cleaning devices on motor vehicles and the like, comprising a source of power and a fluid motor, said motor having a fluid pressure operated part, a second powered part, and a single output shaft, means interconnecting said parts to turn said output shaft and operated from said source for actuation of said devices, separate control connections between said source and said motor to supply power to each motor part, and sesnsing means in said control connections responsive to decrease in power to selectively control the power in said connections.

5. A combined motor for power operated accessory devices having an output shaft, a fluid motor part adapted to turn the shaft, including a vane on said shaft, a casing enclosing the vane, and a motor part operated fluid pressure control valve means operating in timed relation to said shaft and enclosed in said casing, in combination therewith, an electric motor part including a field mounted on the casing, an armature in the field and connected to said output shaft and a commutator means actuated in timed relation with said control valve and adapted for commutator adjustment whereby said motor parts are synchronized.

6. A combined motor for power operated accessory devices having an output shaft, a fluid motor part adapted to turn the shaft including a vane on said shaft, a casing enclosing the vane, a fluid pressure control valve means connected to the shaft and enclosed in said casing, an electric powered motor part having a field mounted on said fluid motor part casing, an armature in the field drivingly connected to said output shaft and a commutator means actuated in timed relation with said control valve for commutator adjustment to synchronize said motor parts, in combination a speed control for said motor comprising a combined throttle valve and switch whereby said motor speed is governed by pumping action of said fluid motor part against the resistance imposed by said throttle valve when both motor parts are powered.

7. A motor accessory drive system for a power driven device on a motor vehicle, comprising first and second power sources on the vehicle, a motor for driving the device powered from said sources of power, independent power connections between said sources of power and said motor, control means for said connections including a manual selector for both of said power connections having a variable speed regulator for said motor in one of said power connections, and power sensing means in the same independent power connection for selectively supplying power to said motor through one or both of said power connections during operation of said motor whereby said regulator is an effective speed control for said motor when operated through one or both of said power connections.

8. In a combined motor for power operated devices having an output shaft, a fluid motor part connected to drive said shaft, and an electric motor part connected to said fluid motor part through said shaft, a control for synchronizing the action of said motor parts comprising a valve for said fluid motor part actuated in timed relation with said shaft, and a switch means for said electric motor part actuated in timed relation to said valve.

9. A system for driving power operated devices on motor vehicles or the like, comprising a power source, a motor operated from said source having an output shaft to drive said devices, said motor including a fluid motor part having a valve part actuated in timed relation to said shaft and an electric motor part having a commutator actuated in timed relation to said valve, and power connections between said source and said motor including a control for selectively operating said motor through one or all of said connections.

10. A system for driving power operated devices on motor vehicles or the like, comprising a power source, a motor operated from said source having an output shaft to drive said devices, said motor including a fluid motor part having a valve part actuated in timed relation to said shaft and an electric motor part having a commutator actuated in timed relation to said valve, and power connections between said source and said motor including a control having a power sensing means for selectively operating said motor through one or all of said connections.

11. A system for driving power operated devices on motor vehicles or the like, comprising a power source, a motor operated from said source having an output shaft to drive said devices, said motor including a fluid motor part having a valve part actuated in timed relation to said shaft and an electric motor part having a commutator actuated in timed relation to said valve, and power connections between said source and said motor including a control having a power sensing means and a manual operator for selectively operating said motor through one or all of said connections.

References Cited in the file of this patent

UNITED STATES PATENTS

| | | |
|---|---|---|
| 1,978,634 | Hueber | Oct. 30, 1934 |
| 2,293,542 | Hamilton | Aug. 18, 1942 |
| 2,345,213 | O'Shei | Mar. 28, 1944 |
| 2,365,557 | Keith | Dec. 19, 1944 |
| 2,376,937 | Pierotti | May 29, 1945 |
| 2,394,384 | Hortsmann | Feb. 5, 1946 |
| 2,398,265 | Tyler | Apr. 9, 1946 |
| 2,427,347 | Bessy | Sept. 16, 1947 |

FOREIGN PATENTS

| | | |
|---|---|---|
| 292,765 | Great Britain | June 28, 1928 |